United States Patent [19]

Ishikawa

[11] Patent Number: 5,607,604

[45] Date of Patent: Mar. 4, 1997

[54] APPARATUS FOR DETECTING VOLTAGE ACROSS THYRISTOR IN ALTERNATING-CURRENT RESISTANCE WELDING MACHINE

[75] Inventor: Sakae Ishikawa, Chiba-ken, Japan

[73] Assignee: Miyachi Technos Corporation, Chiba-ken, Japan

[21] Appl. No.: 445,205

[22] Filed: May 23, 1995

[30] Foreign Application Priority Data

May 30, 1994 [JP] Japan .................................. 6-139416

[51] Int. Cl.$^6$ .................................................. B23K 11/25
[52] U.S. Cl. ........................... 219/110; 219/109; 219/114
[58] Field of Search ................................... 219/108, 109, 219/110, 114; 323/235, 241, 246

[56] References Cited

U.S. PATENT DOCUMENTS 4,104,724  8/1978  Dix et al. .................................. 219/108
4,388,515  6/1983  Mathews .................................. 219/109
4,465,918  8/1984  Kiriyama et al. ........................ 219/110
4,954,686  9/1990  Izume ...................................... 219/110
5,128,604  7/1992  Caen ........................................ 323/235

Primary Examiner—Clifford C. Shaw
Attorney, Agent, or Firm—Wenderoth, Lind & Ponack

[57] ABSTRACT

A thyristor voltage detector includes a current-limiting resistor having a high resistance (e.g., 30 kilo-ohm) and a switching device (e.g., photo MOS FET) of a switching photo coupler which are serially connected between a thyristor and a waveform converter (e.g., a pair of photo couplers). The photo MOS FET is turned on by a light from a light emitting diode of the switching photo coupler in respect to a high level of a switching control signal. A voltage across the thyristor is applied to the waveform converter via the photo MOS FET and the resistor. The arrangement eliminates the need for a step-down transformer, achieves downsizing and cost cutting, and reduces electric power consumption.

3 Claims, 3 Drawing Sheets

APPARATUS FOR DETECTING VOLTAGE ACROSS THYRISTOR IN ALTERNATING-CURRENT RESISTANCE WELDING MACHINE

BACKGROUND OF THE INVENTION

The present invention relates to an apparatus for detecting a voltage across a thyristor in an alternating-current resistance welding machine.

In an alternating-current resistance welding machine, a power voltage is supplied to a primary coil of a welding transformer by means of a thyristor. From a secondary coil of the welding transformer, a welding current (secondary current) flows through a workpiece to metallurgically join the weld zone of the workplace with Joule heat. The magnitude of the welding current is controlled by changing the firing angle of the thyristor.

To measure the welding current and/or power factor angle of the resistance welding machine, it is necessary to detect when the welding current starts and stops flowing in each cycle. When the thyristor is conductive, the welding current flows whereas when the thyristor is nonconductive, no welding current flows. Thus, the voltage across the thyristor (cathode-to-anode voltage) has an opposite phase to that of the welding current. In this view, the voltage across the thyristor is detected for reading the conducting interval of the welding current.

To this end, the prior art uses a step-down transformer, the primary coil of which is connected across the thyristor. The secondary coil of the step-down transformer is connected to a waveform converter comprising a photo coupler or the like for converting the voltage waveform across the thyristor into a standardized waveform (typically binary or rectangular waveform).

The power voltage is a high voltage having a peak of say $200\sqrt{2}$ or $400\sqrt{2}$ volts. The voltage across the thyristor has a similar peak. The secondary voltage across the secondary coil of the step-down transformer has a waveform similar to that across the thyristor. The secondary voltage waveform has a peak of say $20\sqrt{2}$ volts. When such secondary voltage is applied to the light emitting diode of the photo coupler, it emits a light, causing the semiconductor output device of the photo coupler (e.g., photo transistor) to become conductive. Thus, the semiconductor output device of the waveform converter generates a rectangular voltage signal having TTL level (0–5 volts). The timings of the rising and falling edges of the rectangular signal indicate the timings of the start and stop of the welding current conduction, respectively.

As stated, the prior art apparatus for detecting a voltage across the thyristor requires a step-down transformer dedicated to step down the high voltage across the thyristor to a reduced voltage appropriate for the waveform converter (photo coupler). This necessarily results in a large-sized and expensive resistance welding control apparatus. Furthermore, an electric current flows through the secondary circuit of the step-down transformer even when no welding operation is performed, thus wasting the electric power.

SUMMARY OF THE INVENTION

It is, therefore, an object of the invention to provide an apparatus for detecting voltage across a thyristor in an alternating-current resistance welding machine which is smaller in size and more economical without wasting the electric power and without requiring any step-down transformer.

The invention provides an apparatus for detecting a voltage across a thyristor provided in a primary circuit of an alternating resistance welding machine, the apparatus comprising waveform converter means connected in parallel with the thyristor for converting the voltage across the thyristor into a standardized waveform, a resistor serially connected between the thyristor and the waveform converter means, and switching means serially connected between the thyristor and the waveform converter means.

With this arrangement, when the switching means is closed, the voltage across the thyristor is applied to the waveform converter means by way of the switching means and the resistor. The resistor having an appropriately high resistance drops a large portion of the voltage across the thyristor or limits the electric current passing through it so that an appropriate voltage and current is supplied to the waveform converter means. Such voltage and current is essentially equal to that obtained with the step-down transformer. Thus the waveform converter means converts the supplied voltage into a standardized waveform such as a rectangular one. When the switching means is opened, this opens the circuit of the resistor and the waveform converter means so that no electric current passes therethrough and no electric power is consumed.

The waveform converter means may comprise a photo coupler including a light emitting diode connected in parallel with the thyristor, and a semiconductor device conducted by a light from the light emitting diode for generating a binary output signal.

The waveform converter means may comprise a pair of photo couplers wherein respective light emitting diodes are connected in inverse parallel with the thyristor and wherein respective semiconductor devices are connected in parallel with an output circuit.

The switching means may comprise a photo coupler including a light emitting diode responsive to a control signal for conditionally emitting a light, and a high withstand voltage switching device serially connected between the thyristor and the waveform converter means and conducted by a light from the light emitting diode.

BRIEF DESCRIPTION OF THE DRAWINGS

The above and other objects and features of the invention will be more apparent from the following description taken in conjunction with the drawings in which.

DETAILED DESCRIPTION OF PREFERRED EMBODIMENT

Figure 1:
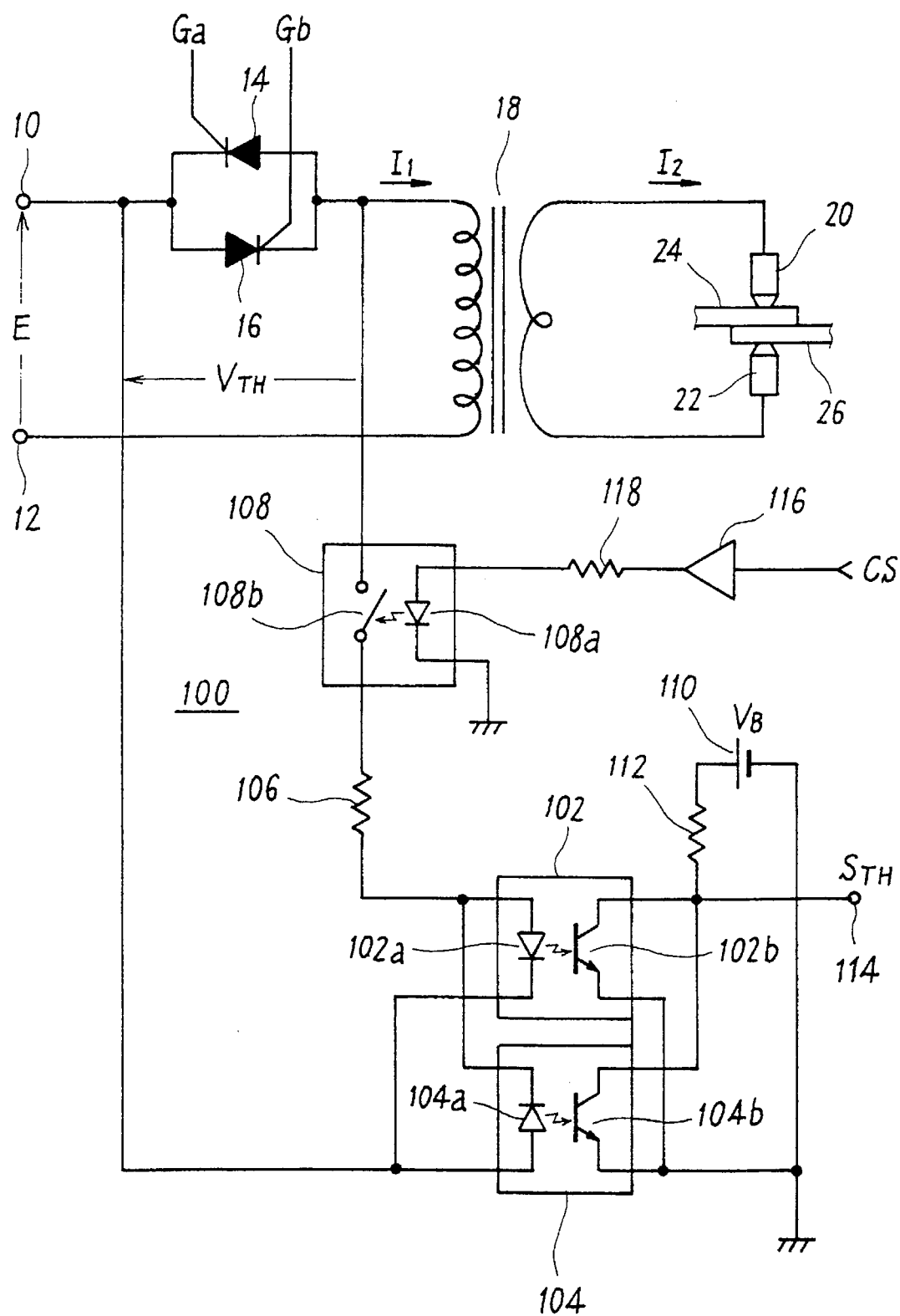
FIG. 1 is a diagram showing an arrangement of a single-phase alternating-current resistance welding machine to which an apparatus (thyristor voltage detector) for detecting a voltage across a thyristor applies in accordance with an embodiment of the invention.

Referring first to FIG. 1, there is shown an arrangement of a single-phase alternating-current resistance welding machine to which a thyristor voltage detector of the embodiment applies.

In the alternating-current resistance welding machine, an AC power voltage E of commercial frequency at input terminals 10 and 12 is supplied to a primary coil of a welding transformer 18 by way of a pair of thyristors 14 and 16 as contactors. An induced electromotive force (secondary voltage) generated across a secondary coil of the welding transformer 18 is applied to workpieces 24 and 26 through a pair of electrode tips 20 and 22, causing a welding current I2 to flow through the secondary circuit. When the welding current I2 flows through the secondary circuit, a proportional and small electric current I1 (primary current) flows through the primary circuit.

The magnitude (effective value) of the welding current I2 is controlled by the firing angle. The resistance welding machine includes a firing circuit (not shown) which applies firing control signals Ga and Gb to respective thyristors 14 and 16 to control their firing timings for controlling the magnitude of the welding current I2.

In accordance with the embodiment, the thyristor voltage detector 100 for detecting a voltage across the thyristors 14 and 16 comprises a waveform converter in the form of a pair of photo couplers 102 and 104 with photo transistor output, a current-limiting resistor 106 and a switching device in the form of photo coupler 108 with photo MOS FET output.

Respective light emitting diodes 102a and 104a of the photo couplers 102 and 104 are connected in inverse parallel with the thyristors 14 and 16. Respective photo transistors 102b and 104b of the photo couplers 102 and 104 are similarly connected in parallel with an output circuit having a DC power supply 110 such as 5 V battery and a resistor 112. Each collector of the photo transistors 102b and 104b is connected to a detector output terminal 114. The detector output terminal 114 is connected to an input terminal of a resistance welding control apparatus (not shown).

The current-limiting resistor 106 and the output switching device 108b of the switching photo coupler 108 are serially connected between the thyristors 14 and 16, and the waveform converting photo couplers 102 and 104. The resistor 106 has a resistance of, say, about 80 kilo-ohm. The switching device 108b of the photo coupler 108, shown as an ON/OFF switch, is implemented by a photo MOS FET. The photo MOS FET can withstand a high voltage of 1000 volts. The light emitting diode 108a of the switching photo coupler 108 receives a switching control signal CS having binary levels.

Figure 2:
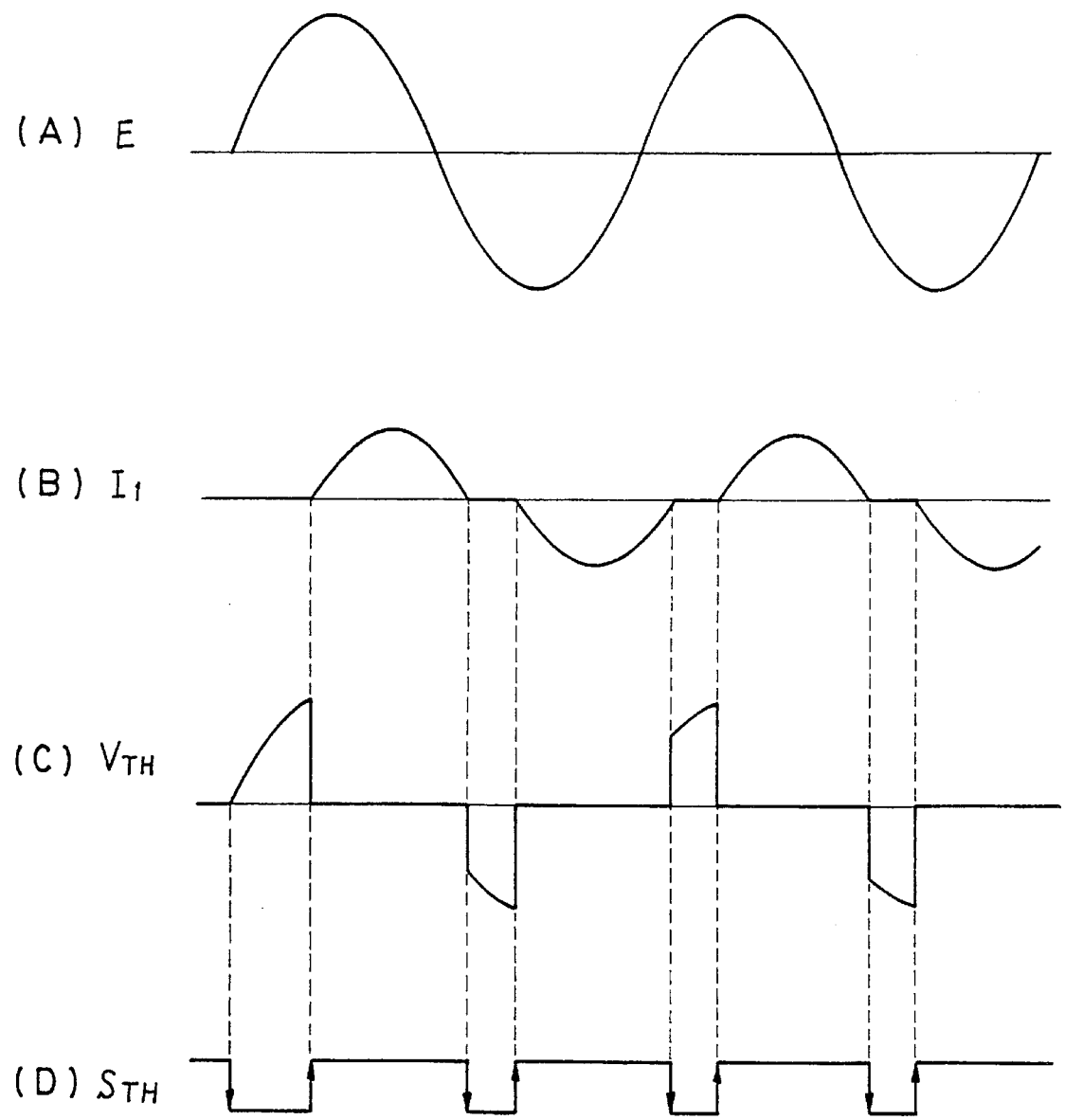
FIG. 2 is a waveform chart showing voltage and current waveforms of the embodiment.

The operation of the thyristor voltage detector 100 will now be described with reference to FIG. 2. With a high level of the switching control signal CS, the light emitting diode 108a of the photo coupler 108 becomes forward biased, and emits a light to place the photo MOS FET 108b in an ON state. Thus, the resistor 106 and the waveform converting photo couplers 102 and 104 are connected across the thyristor 14 and 16.

A resistance welding operation is performed on this condition. The thyristors 14 and 16 are fired at predetermined firing angles so that the welding current I2 flows through the secondary circuit while the primary current I1, which is proportional to the welding current I2, flows through the primary circuit, as shown in FIG. 2(B). When the current I1 or I2 is not flowing or conductive, i.e., both thyristors 14 and 16 are in OFF state, a voltage $V_{TH}$ appears across the thyristors 14 and 16 between their anode and cathode, as shown in FIG. 2 (C).

The voltage $V_{TH}$ across the thyristors is applied to the light emitting diodes 102a and 104a of the waveform converting photo couplers 102 and 104 through the photo MOS FET 108b of the switching photo coupler 108 and the resistor 108. Since the resistor 108 has a considerably high resistance, a large portion of the voltage $V_{TH}$ is dropped by the resistor 106, causing a limited current of maximum 20 milliamperes to flow through the light emitting diodes 102a and 104a.

A positive voltage $V_{TH}$ across the thyristor causes the light emitting diode 104a of the photo coupler 104 to emit a light to place the photo transistor 104b in an ON state, resulting in the ground level (zero volt) at the output terminal 114 during the positive waveform period of the voltage $V_{TH}$. A negative voltage $V_{TH}$ causes the light emitting diode 102a of the photo coupler 102 to place the photo transistor 102b in an ON state so that the output terminal 114 is placed at the ground level (zero volt) during the negative waveform period of the voltage $V_{TH}$. During the zero level period of the voltage $V_{TH}$, neither of the photo diodes 102a and 104b emit a light to place the photo transistors 102b and 104b in an OFF state, so that the output terminal 114 is pulled up to the supply voltage level $V_{BB}$ (5 Volts) from the power supply 110.

Thus, the output terminal 114 provides a voltage signal $S_{TH}$ which coincides in timing with the voltage $V_{TH}$ waveform across the thyristors and which has a binary or rectangular waveform different from that of the voltage $V_{TH}$. The rising and falling edges of the rectangular signal $S_{TH}$ coincides with those of the primary or welding current I1 or I2, as noted from the comparison between waveforms of FIG. 2 (B) and (D). From such timings of the signal $S_{TH}$, the resistance welding control apparatus measures the welding current, current-conduction angle and/or power factor angle. If the thyristors 14 and 16 are destroyed or failed, this is indicated in the signal $S_{TH}$ so that the signal $S_{TH}$ may be used to detect the failure of the thyristors 14 and 16.

In this manner, the thyristor voltage detector 100 of the embodiment eliminates the need of a step-down transformer, but instead employs the resistor 106 connected in series between the thyristors 14 and 16, and the waveform converting photo couplers 102 and 104. Thus the photo couplers 102 and 104 of the waveform converter receive a voltage and current essentially equivalent to that obtained from the step-down transformer and convert it into a standardized or rectangular waveform signal.

In general, the space and cost of the power supply and control apparatus of the resistance welding machine are largely consumed by its transformers. The embodiment does not require any step-down transformer for detecting a voltage across the thyristor, thus achieving considerable downsizing and cost cutting of the apparatus.

The present thyristor voltage detector 100 employs the photo MOS FET 108b of the switching photo coupler 108 which is connected in series between the thyristors 14 and 16, and waveform converting photo couplers 102 and 104. The photo MOS FET 108b is switched between ON and OFF states in response to the light emitting diode 108a of the photo coupler 108 which is controlled by the switch control signal CS. During the rest period of no operation of the resistance welding, the switch control signal CS is set to a low level to keep the photo MOS FET 108b in OFF state so that no electric current flows through the detector 100, resulting in no consumption of the electric power.

The photo couplers 102, 104 and 108 provide electrical isolation between the power lines of the welding machine and the control apparatus, thus safely keeping the control apparatus away from the voltage, current and/or noise from the power lines.

Figure 3:
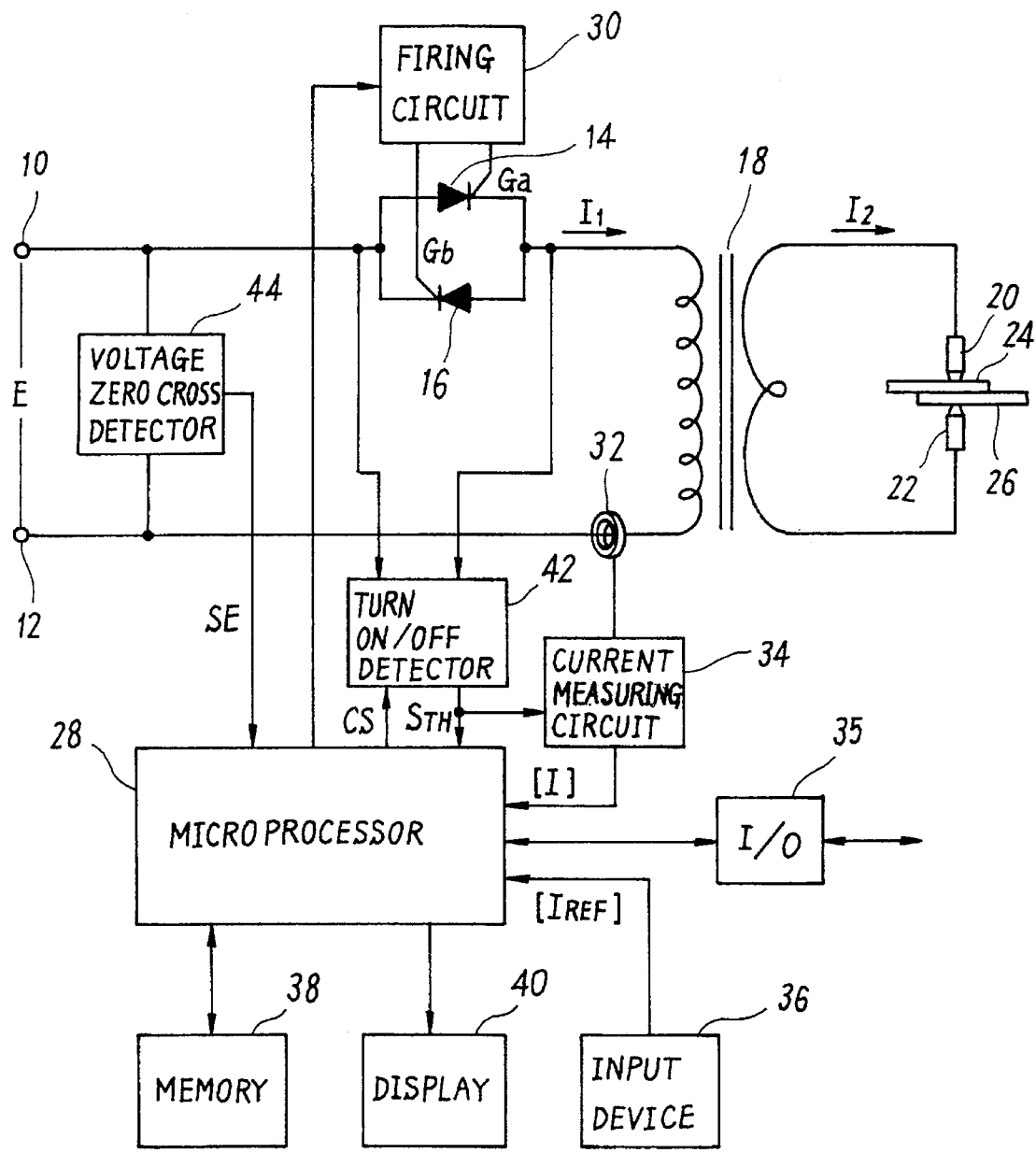
FIG. 3 is a block diagram showing an arrangement of a single-phase alternating-current resistance welding machine with a control apparatus incorporating the thyristor voltage detector of the embodiment.

FIG. 3 shows an arrangement of a resistance welding control apparatus including the thyristor voltage detector of the embodiment. The resistance welding control apparatus comprises a microprocessor 28, a firing circuit 30, a CT coil (current sensor) 32, a current measuring circuit 34, an I/D 35 an input device 36, a memory 38, a display 40, a turn ON/OFF detector 42 and a voltage zero cross detector 44.

In FIG. 3, a turn-on/off detector 42 is implemented by the thyristor voltage detector 100 of the embodiment. The detector 42 generates the signal $S_{TH}$ indicative of the conduction start and stop timings of the primary or welding current I1 or I2, and supplies it to a microprocessor 28 and a welding current measuring circuit 34.

A current transformer (CT) coil 32 is provided in the primary circuit to generate a voltage signal having a waveform derivative of that of the primary current I1. The welding current measuring circuit 34 integrates the output signal from CT coil 32 under the control of the timing signal $S_{TH}$ to provide the effective value [I] of the welding current I2. The measured welding current signal [I] is supplied to the microprocessor 28. The microprocessor 28 computes the error between the measured welding current value [I] with a set welding current value [IREF] stored in a memory 38 on a cycle-by-cycle basis and determines a thyristor firing angle of the next cycle from the error. At the next cycle, the microprocessor 28 turns on or "fires" the thyristors 14, 16 through the firing circuit 30 at the angle thus determined. The arrangement thus provides a constant current feedback control which keeps the welding current I2 equal to the set welding current [IREF].

A voltage zero cross detector 44 detects zero crossings of the power supply voltage E for each half cycle and supplies the detected voltage zero cross signal SE to the microprocessor 28. From the current zero cross signal $S_{TH}$ from the turn-on/off detector 42 and the voltage zero cross signal SE from the voltage zero cross detector 44, the microprocessor 28 determines the power factor angle θ for each cycle by computing or looking up tables.

In the alternating-current resistance welding machine, occurrence of splash abruptly reduces the resistance between the electrode tips 20 and 22 so that the power factor angle correspondingly and abruptly increases. The microprocessor 28 monitors the power factor angle θ of each cycle, detects splash occurrence by finding when the power factor angle exceeds a predetermined value. It displays the result on a display 40 and controls the respective parts of the control apparatus for the required processing. The microprocessor 28 may determine an initial value of the thyristor firing angle for the next welding operation from the measured power factor angle.

The microprocessor 28 responds to welding command signals supplied via an input/output interface circuit 35 to control respect parts of the control apparatus for the execution of the welding operation. In accordance with the embodiment, the microprocessor 28 supplies the switch control signal CS to the detector 42 (thyristor voltage detector 100 in FIG. 1) so that the detector 42 operates only during the welding operation.

An input device 36 comprises a keyboard to input various setting data to the microprocessor 28. A memory 38 stores various programs, data and look-up tables, etc., required for the operation of the microprocessor.

This concludes the detailed description. However, various modifications are obvious to those skilled in the art. For example, the switching device of the photo coupler 108 may be implemented by a photo triac in place of a photo MOS FET. The waveform converting photo couplers 102 and 104 may be of the photo diode output type instead of the photo transistor output type. The current-limiting resistor 106 may be implemented by either a single resistor or a combination of resistors in serial or parallel connection. The invention may also apply to a three-phase alternating-current resistance welding machine in addition to the single-phase one.

What is claimed is:

1. An apparatus for detecting a voltage across a thyristor which is provided in a primary circuit of an alternating-current resistance welding machine, a firing timing of said thyristor being controlled by a control circuit of said welding machine to control a magnitude of a current flowing in said welding machine, said current being a primary current or a welding current, said apparatus comprising:

waveform converter means connected in parallel with said thyristor for converting said voltage across said thyristor into a standardized waveform indicative of a start timing and a stop timing of a conducting interval of said current;

a resistor serially connected between said thyristor and said waveform converter means; and switching means serially connected between said thyristor and said waveform converter means and controlled by a switching control signal from said control circuit to be in an ON state during a resistance welding operation and to be in an OFF state during a period of no resistance welding.

2. The apparatus of claim 1, wherein said switching means comprises a photo coupler including a light emitting diode responsive to said switching control signal for conditionally emitting a light and a switching device serially connected between said thyristor and said waveform converter means and placed in a ON state by the light from said light emitting diode.

3. A resistance welding control apparatus for controlling the magnitude of a current flowing in an alternating-current resistance welding machine, the current being a primary current or a welding current, comprising:

thyristor voltage detecting means for detecting a voltage across a thyristor provided in said welding machine to provide a timing signal indicative of a start timing and a stop timing of a conducting interval of said current;

current measuring means responsive to said timing signal from said thyristor voltage detecting means for measuring said current to provide a measured value of said current on a cycle-by-cycle basis;

thyristor firing angle determining means for computing an error between said measured current value and a preselected current value to determine a thyristor firing angle of the next cycle on the cycle-by-cycle basis;

thyristor firing control means for firing said thyristor at the angle determined by said thyristor firing angle determining means on a cycle-by-cycle basis; and welding control means responsive to an external welding command signal for controlling a welding operation, said welding control means providing a switching control signal to control the operation of said thyristor voltage detecting means, said thyristor voltage detecting means comprising:
   (a) waveform converter means connected in parallel with said thyristor for converting said voltage across said thyristor so as to provide said timing signal;
   (b) a resistor serially connected between said thyristor and said waveform converter means; and
   (c) switching means serially connected between said thyristor and said waveform converter means and controlled by said switching control signal from said welding control means to be in an ON state during a welding operation and to be in an OFF state during a period of no operation of the resistance welding.

\* \* \* \* \*